May 15, 1945.  H. KAESER  2,375,995

TEST PLUG FOR PIPES

Filed Feb. 19, 1943

INVENTOR
HAROLD KAESER
BY Cook & Robinson
ATTORNEY

Patented May 15, 1945

2,375,995

UNITED STATES PATENT OFFICE 2,375,995

TEST PLUG FOR PIPES

Harold Kaeser, Vancouver, Wash.

Application February 19, 1943, Serial No. 476,427

4 Claims. (Cl. 220—24.5)

This invention relates to devices known in the industry to which they belong as "test plugs." More particularly, the invention has to do with improvements in a test plug of that particular kind designed to be applied within the open end portion of an unthreaded pipe section, and then to be expanded for the purpose of temporarily sealing that end of the pipe in order that a pressure test of the pipe may be made.

It is the principal object of this invention to provide a test plug of the above stated character that may be easily and readily located within the end of a pipe and an efficient sealing of the pipe thereby effected by the tightening of a wing nut that is associated with the plug stem; this tightening of the nut operating, by reason of novel devices herein, to diametrically expand the plug body, thereby to cause it to seal the pipe, and also to actuate a plurality of gripping dogs, that are associated with the plug body, into holding contact with the pipe walls to insure the plug against blowing from the pipe under the pressure that may be applied within the pipe in making the test.

Other objects of this invention are to be found in the provision of a test plug wherein the plug body comprises a resilient sealing material confined between inner and outer face plates and is slidably mounted on an axial stem which at its inner end is equipped with a wedge like cross head and at its outer end is threaded and mounts the wing nut thereon; and wherein there are a plurality of holding dogs arranged about the stem in sliding abutment with the inner face plate of the plug body, and adapted to be actuated apart, or radially of the stem, by the wedging action produced thereagainst by the cross head upon tightening the wing nut against the outer face plate of the plug body.

Another object of this invention resides in that means provided for effecting the automatic releasing action of the dogs coincident with the contraction of the plug body that is permitted by the loosening of the wing nut on the stem.

Still other objects of the invention reside in the provision of a test plug of the stated character, including means for making a pressure test connection through the plug stem.

Further objects of the invention reside in the details of construction and combination of the various parts, and in their mode of use as will hereinafter be fully described.

In accomplishing these and other objects of the invention, I have provided the improved details of construction, the preferred forms of which are illustrated in the accompanying drawing wherein—

Figure 1:
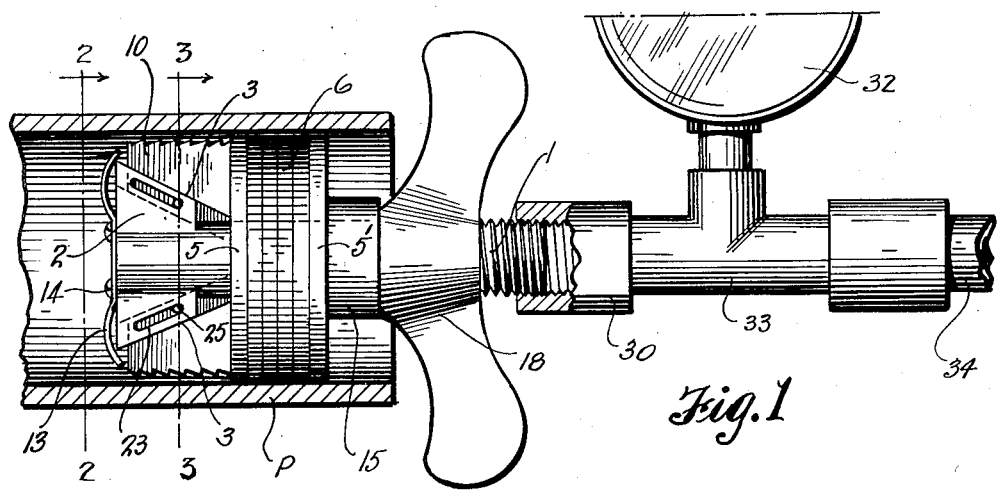
Fig. 1 is a longitudinal, sectional view of the end portion of a pipe to which a test plug embodied by this invention has been applied; showing the position of parts prior to expanding the plug body.

In the drawing, a test plug has been illustrated as applied to the end portion of a pipe designated by reference character P. In its present preferred form of construction, the test plug comprises a central, or axial stem 1. As here shown, the stem is of tubular form and is equipped at what may be designated as its inner end, with a cross head 2; this head being formed at its ends and diametrically opposite each other, with reference to the axial center of the stem, with flat, inclined surfaces 3—3 lying in planes that converge in the direction of the outer end of the stem.

Slidable on the stem, at the outside of the cross head portion, is the plug body. This body comprises inner and outer face plates 5 and 5' of circular form between which a core section 6 is located. This core may be of rubber or any equivalent resilient and expandable material. The inner and outer face plates 5 and 5' preferably are made of metal, are flat and are of a diameter that is just slightly less than the inside diameter of the pipe to which the plug is to be applied. Each disk has a central opening, receiving the stem 1 slidably therethrough with slight clearance. This core 6, of rubber or the like, is of substantial thickness and normally is of the same diameter as the face plates. It may comprise a single piece of material, or, as here shown, may comprise a plurality of circular sections placed face to face to make up a body of the desired thickness. The core 6 is of such resiliency that upon being compressed by the clamping action on the opposite face plates, it will expand diametrically, thus to cause it to tighten about its periphery against the walls of the pipe to seal the joint therewith. Likewise, this clamping action causes the core to tighten about the stem 1, to seal the joint thereabout. When the clamping pressure against the face plates is removed, the core contracts in diameter and the plug body may then be slipped longitudinally of the stem to release the holding dogs, as presently explained, and the device may be easily removed from the pipe to which it has been applied.

Figure 2:
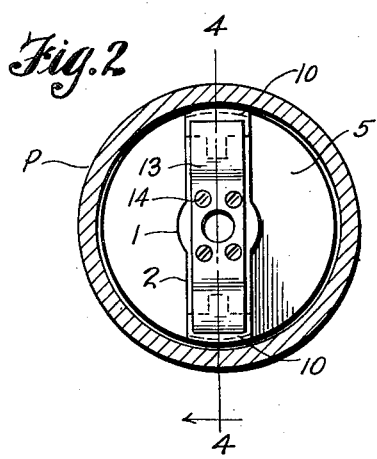
Fig. 2 is a cross section, taken on the line 2—2 in Fig. 1, showing the test plug in end elevation.
Figure 3:
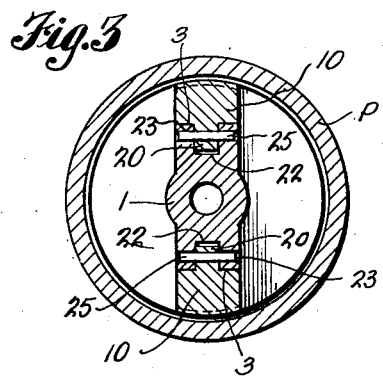
Fig. 3 is a cross section taken on the line 3—3 in Fig. 1, illustrating the mounting of the plug holding dogs on the ends of the cross head.
Figure 5:
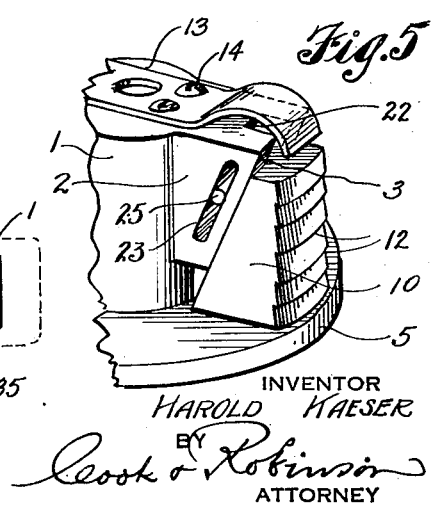
Fig. 5 is a fragmental, perspective view of parts of the plug, particularly illustrating the mounting of a holding dog.

In order that the plug body may be expanded to seal the pipe end, and also in order that it may be securely held in place in a pipe end under the testing pressure which may be applied, I have provided a pair of holding dogs 10—10 that are disposed in sliding contact with the inclined end surfaces 3—3 of the cross head 2. Each of these holding dogs, as will be observed by reference to Figs. 1 and 5, is formed with a flat, beveled inner surface, engaged flatly against and slidable on the corresponding end surface 3 of the cross head. Also, each dog has an outer cylindrically curved surface, conforming to that of the surface of the pipe to be engaged, and these surfaces are transversely toothed, as at 12 in Fig. 5, to give better holding effect when pressed against the pipe wall. The holding dogs are of wedge like character with flat inner and outer end surfaces. At their base ends, these holding dogs are flatly engaged with the inner face plate 5 of the plug body and are urged against this face plate, so as to move therewith relative to the stem when the plug body is moved, by the pressure thereagainst of the outer end portions of a leaf spring 13 that is disposed along the inner end surface of the cross head. As shown in Fig. 2, this leaf spring is held in place by a plurality of screws 14 through its medial portion and anchored in the cross head, and it will be observed in Fig. 1 that the end portions of the leaf spring are arched so that they will remain clear of the ends of the cross head and retain contact with the ends of the dogs for the full inward movement of the dogs when retracted to release the plug.

Slidable on the stem at the outside of the plug body, and engaged against the outer face plate 5′, is a sleeve 15, and threaded onto the outer end of the stem and engaging the outer end of the sleeve, is a wing nut 18, which upon being tightened against the sleeve, will operate to move the plug body along the stem and toward the cross head. This tightening action of the nut has two objects: First, it moves the plug body toward the cross head, thereby causing the gripping dogs to be moved likewise in the longitudinal direction of the stem, and thus to cause them to slide up the inclined end surface 3—3 of the cross head, and by this movement to be moved outward or radially of the stem and brought into gripping or holding contact with the pipe walls. Second, as the dogs are thus pressed into holding contact with the pipe walls, the plug body will be placed under compression between the face plates 5 and 5′, and as the tightening of the nut continues, the core of the plug will be expanded accordingly to effect the sealing of the pipe. It is to be understood that the tighter the nut is drawn, the greater will be the holding effect of the dogs against the pipe walls and the tighter will be the sealing of the joint by the expanding pressure applied to the core. This expanding of the core not only seals the joint about the periphery of the core body, but also seals the joint between the stem of the device and the core.

To retain the holding dogs in proper relationship to the cross head, it is desirable that each be formed along its inner, inclined surface, with a longitudinal rib 20 and that the end surfaces of the cross head be formed with channels 22 to slidably receive these ribs therein. Also, the end portions of the cross head be formed with inclined slots 23 sloping in accordance with the sloping of the corresponding end walls and that pins 25 be extended through the ribs and slidably contained in the slots, thus to hold the dogs in their proper functional positions relative to the cross head.

With this pin and slot connection, as disclosed, the dogs will be retained in place when the test plug has been withdrawn from the pipe, and it is significant also that due to the tension that is applied against the dogs by the leaf spring, they will be urged outwardly, with reference to the stem, and thereby retracted to clear them from contact with the pipe walls and dispose them within the periphery of the body of the plug, thus insuring easy removal of the plug from a pipe section. As an alternative arrangement, the longitudinal ribs of the dogs might be formed with slots and the pins secured in the cross head to accomplish the same results as are accomplished by the pin and slot connection above described.

Figure 4:
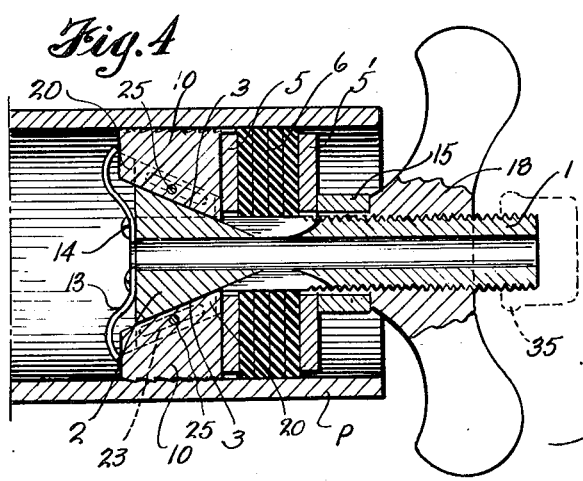
Fig. 4 is a sectional view in the axial plane of the plug on the line 4—4 in Fig. 2, showing the position of parts after the plug body has been expanded.

In Figs. 1 and 4, it is to be observed that the stem portion of the test plug is tubular. Therefore, a pressure connection may be effected with the pipe being tested through the stem of the plug by connecting a pressure pipe with the outer end of the stem and in such connection, a pressure gauge could conveniently be incorporated, as has been illustrated in Fig. 1, wherein 30 designates a fitting applied to the outer end of the stem 1, 32 is a pressure gauge, and 33 a fitting to which both the pressure gauge and the pressure medium supply pipe 34 connect; the fitting 33 being threaded into the fitting 30.

Should it be desired that the test plug be used merely to close the end of the pipe to be tested and that the application of testing pressure be applied at the other end, then the stem 1 may be closed by a cap applied to its outer end as has been shown in Fig. 4 at 35.

Test plugs of this character may be made in various sizes to adapt them to the testing of pipes of various diameters. In all instances, the parts retain the same relationship, and are substantially of the same construction, regardless of change in size or diameter of the plug body.

It may also be explained that two or more of the holding dogs might be used. In the event that more than two are used in a plug, the cross head would be changed accordingly to accommodate them and the dogs would be arranged at equally spaced intervals about the axis.

Test plugs of this character have already been put to use and have been found to be more economical, from the standpoint of cost and time employed for their application or removal, than devices heretofore used for this purpose.

It is apparent that modifications in the design and in the arrangement of parts might be made without departing from the spirit of the invention, and for this reason, it is not desired that the claims which terminate this specification shall be confined to details, but shall be given an interpretation that is commensurate with the scope of the invention herein disclosed. For example, the cross head 10 might be made independent of the stem 1 and formed with a central bore into which the stem might be threaded to mount the cross head. This might prove to be advantageous for the reason that since the stem is the major wearing item of the plug, this would enable it to be replaced when it becomes sufficiently worn that this would be desirable.

Also, the spring 13 might be secured to the cross head by riveting, by clamping or by other means than the screws illustrated, that would be satisfactory for this purpose. The tightening screw 18 might be merely in the form of a collar with two or more radial legs made of short lengths of pipe and these might be extended to any length to give a desired amount of leverage.

Also, the pin and slot connections 23 and 25 might be reversed so that the pin is carried by the head rather than by the holding dog.

Having thus described my invention, what I claim as new therein and desire to secure by Letters Patent is:

1. A test plug for insertion within a pipe, comprising an axial stem, a wedge-like cross head fixed on the inner end of the stem, a plug body slidably fitted on the stem and having a resilient core adapted to be diametrically expanded under endwise compression of the plug body, holding dogs engaged with the wedging surfaces of the cross head and serving as abutments for the plug body; said dogs being adapted to be actuated along the wedging surfaces by movement of the plug body toward the cross head, and a nut threaded onto the stem and adapted to be tightened against the plug body to effect the adjustment of the dogs into holding contact with the pipe walls and the endwise compression of the plug body whereby to effect the diametrical expansion of the resilient core into sealing contact with the pipe walls.

2. A test plug adapted to be applied within the end of a pipe, comprising an axial stem portion, a cross head fixed on the inner end of the stem having wedge forming end surfaces, a plug body slidably fitted to the stem and movable toward and from the cross head, pipe gripping dogs having sloping surfaces disposed against said wedge forming surfaces of the cross head, and slidably engaging the inner face of said plug body; said plug body including a resilient core material that is diametrically expandable under endwise compression of the body, and a nut threaded onto the stem and adapted to be tightened against the outer end of the plug body to first actuate the dogs into holding contact with the pipe and then to effect that endwise compression of the plug body whereby the core material is diametrically expanded into sealing contact with the pipe.

3. A test plug as recited in claim 2 wherein the holding dogs have sliding connection with the cross head to prevent disassociation and yieldable means fixed on the cross head acts against the dogs to urge them to retracted positions on that movement of the plug body that is effected by loosening of the clamp nut.

4. A test plug applicable within a pipe, comprising an axial stem, a cross head fixed on the stem at its inner end, having beveled end surfaces providing a wedge like function for the cross head, a plug body slidably fitted to the stem, pipe gripping dogs having end surfaces seated slidably against the inner faces of the plug body, and having beveled inner surfaces in sliding contact with the wedging surfaces of the cross head, and having outside surfaces toothed for holding contact with the pipe walls; said plug body including inner and outer face plates and an intermediate core portion of resilient material, diametrically expandable into sealing contact with the pipe walls under endwise pressure of the body, a nut threaded on the stem to engage the outer plate to effect the inward movement of the plug along the stem whereby the dogs will be moved against the wedging surfaces of the cross head and actuated outwardly into holding contact with the pipe, and whereby the core portion of the plug body is subsequently placed under compression to effect its diametric expansion to seal its connection both with the stem and with the pipe; said cross head having its beveled end surfaces longitudinally channeled and said dogs having ribs on their inner surfaces slidable in the channels, and a spring on the cross head acting against the dogs to yieldingly urge them to retracted positions.

HAROLD KAESER.